UNITED STATES PATENT OFFICE.

CYPRIEN MARIE TESSIÉ DU MOTAY AND CHARLES RAPHAEL MARÉCHAL, OF METZ, FRANCE.

IMPROVED MODE OF PRODUCING HYDROGEN GAS.

Specification forming part of Letters Patent No. 70,704, dated November 12, 1867.

*To all whom it may concern:*

Be it known that we, CYPRIEN MARIE TESSIÉ DU MOTAY and CHARLES RAPHAEL MARÉCHAL, of Metz, in the Empire of France, have invented a certain new and Improved Method of and Means for Producing Hydrogen Gas; and we hereby declare the following to be a full, clear, and exact description of the same.

It is well known that carbon, either pure or combined with hydrocarbons, is decomposed at a temperature of orange-red heat by steam, and that it produces hydrogen and carbonic acid mixed more or less with oxide of carbon. It is also known that the hydrogen produced by the decomposition of the carbon by means of steam cannot, by the means at present employed, be produced economically: First, because steam, in order to be generated, must absorb a great quantity of latent heat. Second, because this vapor produced at a temperature of 100° requires a considerable quantity of free heat in order to be raised to the temperature at which it is decomposed, and this heat must either be taken from special apparatus for superheating, or it must be furnished by the incandescent coal, which it ought to decompose. Third, because the retorts containing the carbon which serves to decompose the water, when brought to a red heat and exposed to a direct contact with the steam, soon become damaged and unfit for use.

This being the case, we have sought a more economical and rational method of producing hydrogen by the decomposition of water by means of carbon; and we have discovered the following method:

Alkaline and earthy-alkaline hydrates—such as the hydrates of potash, soda, strontian, baryta, and chalk, &c.—mixed with charcoal, coke, anthracite pit-coal, peat, &c., and heated with these combustibles to a red heat, are decomposed by these combustibles into carbonic acid and hydrogen without further loss of heat than that due to the production of the carbonic acid and hydrogen.

The hydrates of potash, soda, &c., and especially the hydrates of chalk employed in order to be decomposed by the coal into hydrogen and carbonic acid, can be used indefinitely in this process, provided that, on each repetition of the same, they are moistened with water, so as to reform the decomposed hydrates.

In this operation the hydrogen gas is generated without any special production of steam, and may thus be produced without a boiler, and without other generating apparatus than the retorts themselves. Moreover, these retorts, for this reason, being unexposed to the direct action of the steam, and not subject to any interior alteration or damage, it follows, therefore, that the hydrogen gas produced by the decomposition of the above-named hydrates by means of carbon can be generated at quite a small price, and with the same facility as are to-day the carbureted hydrogens arising from the distillation of pit-coal or other organic hydrocarbon matter.

These alkaline and earthy-alkaline hydrates may be mixed with the different mineral or vegetable combustibles either in a definite chemical proportion or without a fixed or determined proportion, and in any suitable distilling or heating apparatus, in order to produce, when heated to a red heat, hydrogen gas fitted for illuminating and heating purposes.

Having now described our invention, and the manner in which the same is or may be carried into effect, what we claim, and desire to secure by Letters Patent, is—

The method of and means for producing or generating hydrogen gas, substantially as herein set forth and described.

In testimony whereof we have signed our names to this specification before two subscribing witnesses.

C. TESSIÉ DU MOTAY.
C. R. MARÉCHAL.

Witnesses:
J. ARMENGAUD,
C. LAFOUD.